Feb. 15, 1966     C. G. HOWARD     3,235,783
RECTIFIER DEVICE FOR RAILWAY SIGNALING SYSTEMS
Filed Oct. 2, 1961     2 Sheets-Sheet 1
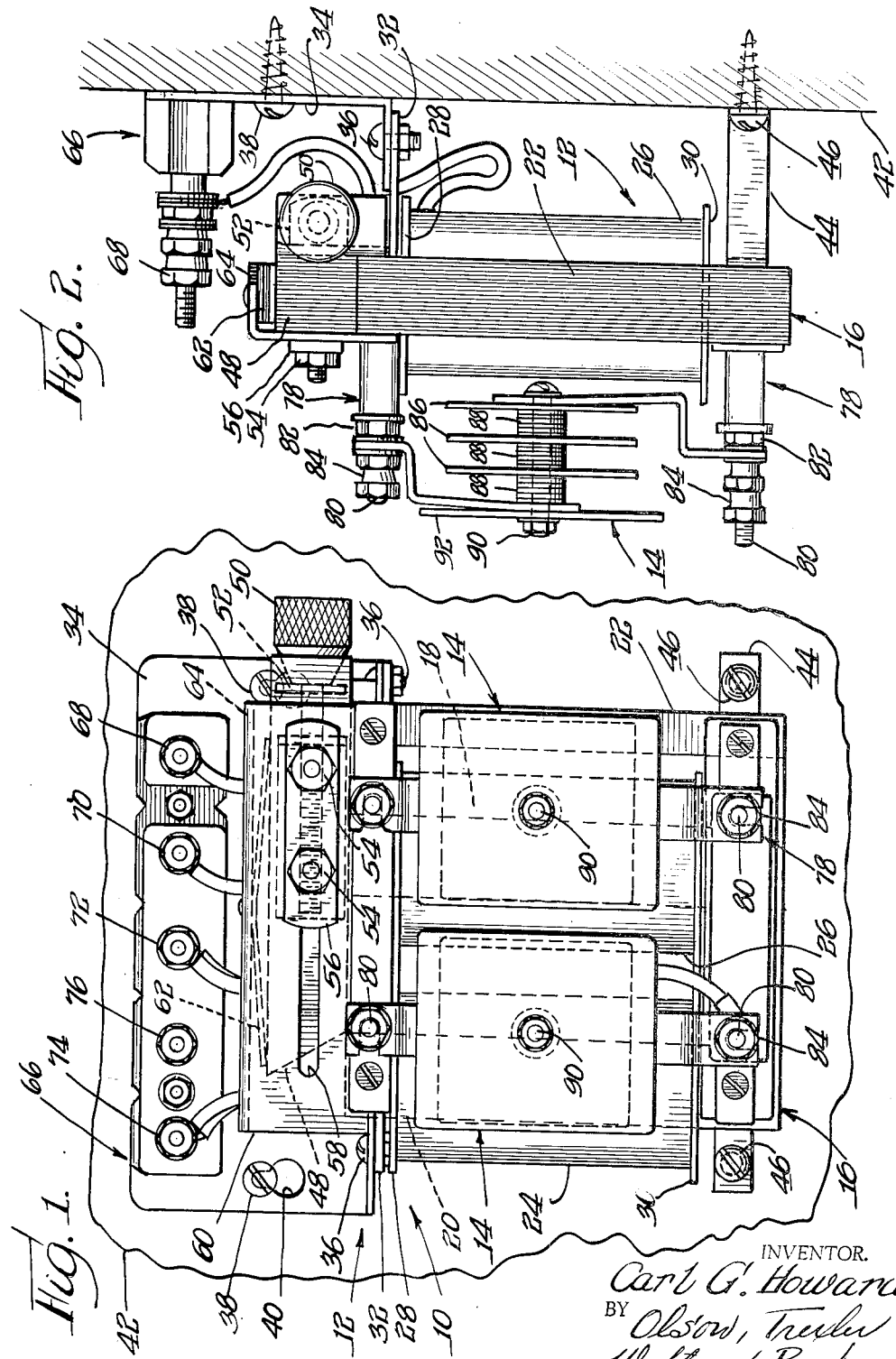
INVENTOR.
Carl G. Howard
BY Olson, Trexler
Wolters & Bushnell
Attys.

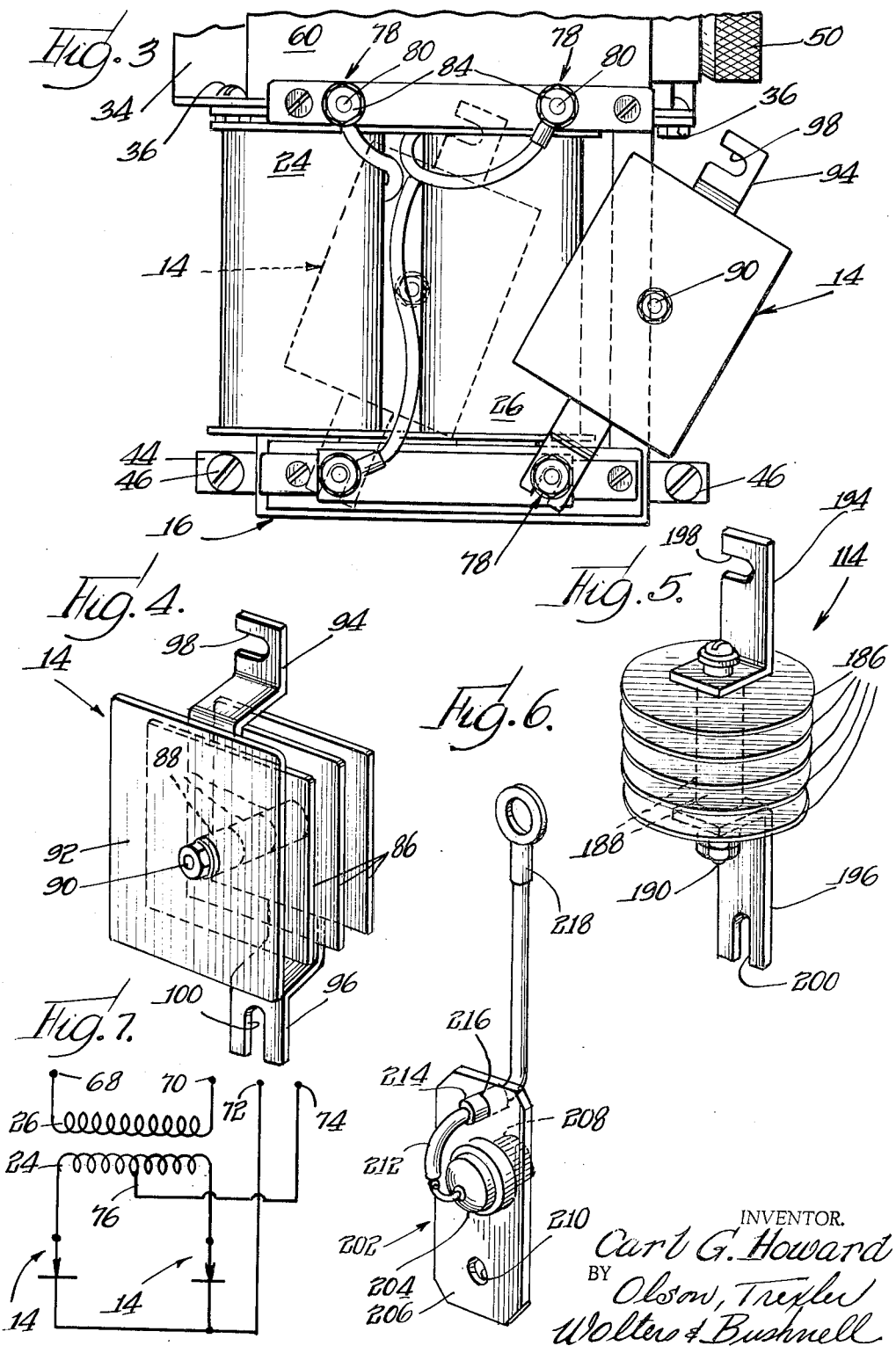

United States Patent Office 3,235,783
Patented Feb. 15, 1966

3,235,783
RECTIFIER DEVICE FOR RAILWAY
SIGNALING SYSTEMS
Carl G. Howard, 261 Lakeside Place, Highland Park, Ill.
Filed Oct. 2, 1961, Ser. No. 142,217
6 Claims. (Cl. 321—8)

This invention relates generally to railway signaling devices and especially to the sources of electrical energy for such devices.

In order to insure reliable performance, railway signaling devices commonly employ batteries as a source for their operating energy, charging of the batteries being achieved by transformer-rectifier units stationed along the right-of-way. According to conventional practice, each transformer is mounted in an equipment box and the rectifier is closed in a cage which is fastened to the back of the transformer in a semi-permanent manner. This arrangement protects the rectifiers from mechanical damage but renders repair of the units almost impossible in the field. Of course, electrical damage to the transformer-rectifier units can still occur, lightning being a frequent source of such damage; and the rectifiers have been found to be much more susceptible to electrical damage than the transformers. As a consequence, many transformer-rectifier units have been returned to the signal shop for repair when only the rectifier was damaged. Much unnecessary handling and expense has resulted.

Therefore, a general object of the present invention is to provide a new and improved transformer-rectifier unit for railway signaling equipment.

Another object of the invention is to provide a transformer-rectifier unit which is arranged to facilitate repair and replacement of the rectifier.

Still another object of the invention is to provide a battery charging unit that is simple and inexpensive to manufacture.

A further object of the invention is to provide a novel rectifier assembly for use in railway signaling systems.

Additional objects and features of the invention pertain to the particular structure and arrangements whereby the above objects are attained.

A structure in accord with the invention includes a transformer assembly adapted to be mounted in a stationary position and having a readily accessible face, a rectifier assembly, and means acting between the rectifier assembly and the transformer assembly mechanically and releasably to mount the rectifier assembly at the accessible face of the transformer assembly and electrically to connect the rectifier assembly in circuit between the transformer assembly and an output line.

The invention, both to its structure and mode of operation, will be better understood by reference to the following disclosure and drawings forming a part thereof, wherein:

FIG. 1 is a front elevational view of a transformer-rectifier unit constructed in accordance with the principles of the invention;

FIG. 2 is a side elevational view of the arrangement of FIG. 1;

FIG. 3 is a view similar to the showing of FIG. 1, schematically illustrating assembly of the rectifiers to the transformer;

FIG. 4 is a perspective view of a rectifier assembly used in the embodiment of FIGS. 1–3;

FIG. 5 is a perspective view of a modified rectifier assembly;

FIG. 6 is a perspective view of a still further modified embodiment of the rectifier assembly; and FIG. 7 is a schematic circuit diagram for the transformer-rectifier unit of FIGS. 1–3.

Referring now in detail to the drawings, specifically to FIGS. 1 and 2, a transformer-rectifier unit indicated generally by the numeral 10 will be seen to include a transformer assembly 12 and a pair of similar rectifier assemblies 14. The transformer assembly 12 comprises an E-shaped, magnetic core 16 of conventional laminated construction having two upright legs 18 and 20 and a shunting leg 22. A secondary coil 24 surrounds leg 20 and a primary coil 26 surrounds legs 18 whereas an upper plate 28 and a lower plate 30 are employed in physically securing the coils 24 and 26 in rigid relationship.

A mounting plate 32 extends rigidly from the core 16 to be affixed to a rearwardly disposed, L-shaped mounting bracket 34 by means of nut-and-bolt arrangements 36. Screws 38 pass through inverted, keyhole-shaped apertures 40 formed in the mounting bracket 34 in order to secure the transformer assembly 12 to a suitable structure 42, as for example the backboard of a signal case. A lower bracket 44 extends rigidly from core 16 underlying the bracket 34; and screws 46 pass through appropriate apertures in bracket 44 threadedly to engage the structure 42 for completing the mounting of transformer assembly 12.

A laminated keeper 48 traverses the upper ends of the legs of core 16 in contact therewith to complete the magnetic circuit; and the position of keeper 48 relative to the legs 18 and 20 is arranged to be variable in order that the reluctance and therefore the voltage in the secondary coil 24 may be varied. The position of keeper 48 is advantageously regulated by means of a manual adjusting screw 50 which is held in position by a bracket 52 and which threadedly engages the keeper or is otherwise suitably attached thereto. A pair of locking screw arrangements 54 are rigid with a slidable plate 56 and pass through a horizontal slot 58 fashioned in a bracket 60 thereafter to engage the keeper 48. Thus, the position of the keeper can be manually regulated by means of the screw 50, and the desired position can be securely maintained by means of the locking screw arrangements 54. An inflected leaf spring 62 underlies a horizontal plate portion 64 of the bracket 60 in order to bias the keeper 48 into firm contact with the upper ends of the legs of core 16.

In order to facilitate making connections to the transformer assembly 12, a connector block 66 is affixed to the vertical plate portion of bracket 34 above the upper surface of bracket 60. The connector block 66 includes output terminals 68 and 70, input terminals 72 and 74, and a tap 76 for connecting the primary coils in series for 230 volt operation.

It is to be observed that, when the transformer-rectifier unit 10 is constructed and arranged as described hereinabove, the front of the unit which is shown in FIG. 1 defines a readily accessible face; and in accordance with an important feature of the present invention, the rectifier assemblies 14 are releasably mounted at this accessible face. Accordingly, insulated terminal assemblies 78 extend forwardly and rigidly from the transformer unit 12 for use in mechanically mounting and electrically connecting the rectifier assemblies 14 thereto. An upper and a lower terminal assembly 78 are provided for each of the rectifier assemblies 14; and advantageously, each of the assemblies 78 includes a threaded stud 80, a nut 82 which defines a stop, and a locknut arrangement 84.

Turning to FIG. 4, a rectifier assembly 14 will be seen to include a suitable number of selenium rectifier cells 86 fashioned in rectangular shape and arranged in a horizontal stack. The cells 86 are joined together in spaced-apart relationship by means of spacers 88 and a bolt arrangement 90. Electrical connections between the cells 86 are made in any suitable manner, and an insulative shield 92 is usefully mounted to the front surface of the stacked cells to provide mechanical protection therefor.

A bracket element 94 is physically secured to one end of the rectifier stack in electrical connection with one terminal thereof, and a second bracket element 96 is physically secured to the other end of the stack in electrical connection with a different terminal thereof. The bracket elements 94 and 96 are fashioned of brass or some other suitable, electrically conductive material; and the free ends of these brackets are arranged in approximately coplanar relationship, bracket 94 being fashioned with a notch 98 and bracket 96 being fashioned with a notch 100.

In order to facilitate attachment of the rectifier assembly 14 to the upper and lower insulated terminal assemblies 78 intended therefor, notch 98 is arranged to open edgewise of the bracket element 94 in a direction generally perpendicular to the axis of the rectifier stack; and the notch 100 is arranged to open edgewise from the bracket element 96 in a generally perpendicular direction relative to the notch 98. Thus, when the locknut arrangement 84 is loosened on the threaded stud 80 of the lower terminal assembly 78, the bracket element 96 can be easily coupled to the terminal assembly with notch 100 receiving the stud 80 between nut 82 and the locknut arrangement 84. With the floor of notch 100 residing in contact with the stud 80, the rectifier assembly 14 can be pivoted about the lower terminal assembly 78 from the position shown in FIG. 3 and into an upright position in which the bracket element 94 engages the upper terminal assembly 78. In this latter position, notch 98 receives the stud 80 of the upper terminal assembly in a region between the nut 82 and the loosened locknut 84. After the rectifier assembly 14 has been thus disposed and placed, the locknut arrangements 84 can be tightened, as by means of a wrench provided for such purpose.

As will be recognized, when the notch 98 opens to the left as viewed in FIG. 3, it is somewhat more convenient to assemble the leftmost of the two rectifier assemblies before the rightmost. The reverse order, of course, is more convenient in removing the rectifier assemblies from the transformer assembly. In any event, it will become apparent that the arrangement of the rectifier assemblies and their mounting on the assessible face of the transformer assembly results in a highly convenient unit which is both easy to test and easy to maintain, the rectifier assemblies being readily removable from the transformer assembly and replaceable in the field.

Having thus described on construction of the invention, it is important now to state how the illustrated embodiment operates. Therefore and with particular reference to FIG. 7, it is to be pointed out that the transformer-rectifier unit 10 is particularly arranged to deliver full-wave rectifier energy at the output terminals 72 and 74; and as will become apparent from an inspection of the circuit diagram of FIG. 7, each of the rectifier assemblies 14 provides rectification of one-half of each full wave. By using two half-wave rectifiers in a center-tap circuit, defects in the transformer-rectifier unit can readily be located and corrected in the field. For example, if the transformer-rectifier unit is observed as not charging its related battery properly, the voltage at the secondary coil 24 may be easily determined with a voltmeter; and upon finding approximately one-half the proper voltage at this point, the field maintenance man will be informed that one of the rectifier assemblies is defective. Removal of one rectifier assembly and subsequent retesting of the output voltage of the unit will apprise him of which rectifier assembly is defective, continuation of one-half the proper output indicating the removed rectifier assembly is defective and zero output indicating the remaining rectifier assembly is defective. Removal and replacement of the rectifier assemblies will proceed as has been described hereinabove.

In the event that the field maintenance man fails to have a replacement rectifier assembly available, the damaged rectifier assembly can be removed, whereupon the unit 10 is altered from full-wave rectification to half-wave rectification. In order to get proper output from the unit, the reluctance in core 16 is varied by means of the adjusting screw 50 so as to vary the output of the secondary coil 24, thus arriving at the required value. Such modification has proved acceptable as at least a temporary expedient in railway signaling systems because such systems conventionally require the normal operating capacity of a component to be considerably less than its peak capacity in order successfully to resist those extreme conditions sometimes encountered in use.

In addition, the transformer-rectifier unit of the invention is arranged to eliminate factory assembly of the basic components. Because the rectifier assemblies are not housed in a protective cage, it has proved advantageous to ship the rectifier assemblies separate from the transformer assemblies whereupon installation personnel can readily situate the rectifier assemblies in place on the transformer assembly once the transformer assembly has been connected in the signal box. The same ease and facility is available in such installation as is present in replacement of the rectifier assemblies in the course of maintenance activities.

While one embodiment of the invention has been thus far described, it should be understood that the invention is not limited thereto since many modifications may be made. For example and turning to FIG. 5, a modified rectifier assembly 114 will be seen to include five selenium rectifier cells 186 fashioned as circular plates and joined together in vertically spaced-apart relationship by means of insulative spacers 188 and a connecting bolt arrangement 190. The rectifier assembly 114 additionally includes bracket elements 194 and 196 secured to opposite ends of the stacked rectifier cells by means of the bolt arrangement 190. The bracket element 194 is fashioned with a notch 198 that opens through an edge of the bracket element in a direction approximately at right angles with the axis of the stacked cells. Furthermore, bracket element 196 is apertured with a notch 200 which opens from an end edge in a direction approximately parallel with the axis of the stacked cells and approximately at right angles with the direction in which notch 198 opens. As will become apparent, rectifier assembly 114 can be readily assembled to the transformer assembly 12 in a manner similar to the rectifier assembly 14.

It is important to realize that the invention is not limited to the use of selenium rectifier cells. Therefore and turning to FIG. 6, a rectifier assembly 202 will be seen to include a silicon diode 204 which is affixed to an electrically conductive mounting plate 206 serving as a heat sink. Specifically, the diode 204 is housed in a serrated or grooved casing 208 which wedgedly engages a hole appropriately provided in the plate 206. The plate 206 is also provided with a bore 210 for use in mounting the assembly 202 to a cooperating transformer assembly. Furthermore, a lead 212 is electrically connected to the diode 204 and passes through a strain relief bushing 214 fixed in a hole 216 bored in the plate 206. The lead 212 terminates in a receptacle or terminal clip 218 which is employed in completing the physical mounting and electrical coupling of rectifier assembly 202.

The specific examples herein shown and described should be considered as illustrative only. Various changes in structure may occur to those skilled in the art; and these changes are to be understood as forming a part of this invention insofar as they fall within the spirit and scope of the appended claims.

The invention is claimed as follows:

1. In a railway signaling system, the combination comprising: a transformer assembly adapted to be mounted in a stationary position and having a readily accessible front face forming substantially a limit for said transformer assembly; a rectifier assembly; and means acting between said rectifier assembly and said transformer assembly mechanically and releasably to mount said rectifier assembly at and forwardly of said face and electrically to contact said rectifier assembly in circuit between said transformer assembly and an output line, said last mentioned means including first mounting means of electrically conductive material rigid with and electrically connected to one terminal of said rectifier assembly and second mounting means of electrically conductive material physically secured and electrically connected to another terminal of said rectifier assembly, said first and second mounting means being apertured to receive spaced quick release fasteners projecting forwardly from said face and physically mounting and electrically connecting said rectifier assembly to said transformer assembly forwardly of said face.

2. In a railway signaling system, the combination according to claim 1 wherein said rectifier assembly includes a plurality of rectangular cells spaced-apart in horizontally stacked relationship.

3. In a railway signaling system, the combination according to claim 1 where said rectifier assembly includes a plurality of circular cells spaced-apart in vertically stacked relationship.

4. The combination set forth in claim 1 wherein said rectifier assembly comprises a silicon diode having two terminals, one of the mounting means comprising a plate electrically connected to one terminal of said diode and physically and thermally connected to said diode as a heat sink therefore, the other mounting means being connected to the second terminal of said diode.

5. In a railway signaling system, the combination comprising a transformer assembly adapted to be mounted in a stationary position on a substantially vertical wall and having a readily accessible substantially vertical front face forming substantially a limit for said transformer assembly, a plurality of pairs of mounting posts extending forwardly from said front face and having quick release fastener means thereon, the posts of each pair being substantially in vertical alignment, and a plurality of rectifier assemblies, each rectifier assembly having at least one rectifying element and a pair of electrical connectors mechanically and electrically connected thereto and extending in relatively opposite directions therefrom, said electrical connectors at their extremities respectively having means providing an opening therein receivable on a respective one of said posts to mount said plurality of rectifier assemblies forwardly of said front face in side by side relation.

6. The combination as set forth in claim 5 wherein the electrical connectors comprise strap-like elements with the extremities thereof lying parallel to said front face, the opening in the lowermost extremity of each electrical connector comprising a slot opening vertically down, the opening in the upper electrical connector comprising a horizontal slot opening transversely of said upper connector.

References Cited by the Examiner

UNITED STATES PATENTS

| | | | |
|---|---|---|---|
| 2,921,243 | 1/1960 | Johnson | 317—234 |
| 2,944,197 | 7/1960 | Kneisley | 317—234 |
| 2,974,263 | 3/1961 | Akins | 317—234 |
| 3,040,232 | 6/1962 | Healis | 317—234 |
| 3,054,933 | 9/1962 | Meykar | 321—8 |
| 3,064,179 | 11/1962 | Wagner | 321—8 |

LLYOD McCOLLUM, *Primary Examiner.*